United States Patent
Wilfred et al.

(10) Patent No.: US 10,817,691 B1
(45) Date of Patent: Oct. 27, 2020

(54) SYSTEMS AND METHODS FOR ADAPTING SWIPE SPEEDS FOR BARCODE READERS

(71) Applicant: ZEBRA TECHNOLOGIES CORPORATION, Lincolnshire, IL (US)

(72) Inventors: Sajan Wilfred, Kollam (IN); Pragnesh Kishorbhai Sanchaniya, Bangalore (IN); John Britts, Port Jefferson Station, NY (US); Robert James Pang, Williston Park, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 12 days.

(21) Appl. No.: 16/447,747

(22) Filed: Jun. 20, 2019

(51) Int. Cl.
   *G06K 7/10* (2006.01)
   *G06T 7/13* (2017.01)
   *G06T 7/20* (2017.01)
   *G06K 9/00* (2006.01)

(52) U.S. Cl.
   CPC ....... *G06K 7/1096* (2013.01); *G06K 7/10198* (2013.01); *G06K 9/00375* (2013.01); *G06T 7/13* (2017.01); *G06T 7/20* (2013.01)

(58) Field of Classification Search
   None
   See application file for complete search history.

(56) References Cited

U.S. PATENT DOCUMENTS

| | | | |
|---|---|---|---|
| 7,296,744 B2* | 11/2007 | He | G06K 7/10732 235/454 |
| 2012/0211565 A1* | 8/2012 | Colavito | G06K 7/1096 235/462.36 |
| 2017/0091502 A1* | 3/2017 | Furlong | G06K 19/0614 |

* cited by examiner

*Primary Examiner* — Kristy A Haupt
(74) *Attorney, Agent, or Firm* — Yuri Astvatsaturov (57) ABSTRACT

Systems and methods for adapting swipe speeds for barcode readers. A barcode reader includes a housing and an optical imaging assembly positioned at least partially within the housing. The optical imaging assembly has a field of view (FOV). The optical imaging assembly is operable to capture one or more images of the FOV. The barcode reader also includes a processor communicatively coupled to the optical imaging assembly. The processor is configured to initiate an identification session when a target at least one of (i) enters the FOV and (ii) is in the FOV. The processor further is configured to, responsive to initiation of the identification session: terminate the identification session in response to identifying a product code associated with the target resulting in a termination of the identification session; responsive to the termination of the identification session, prevent initiation of a subsequent identification session until a detection of the target exiting the FOV; and responsive to the detection of the target exiting the FOV, enable initiation of a subsequent identification session.

26 Claims, 10 Drawing Sheets

SYSTEMS AND METHODS FOR ADAPTING SWIPE SPEEDS FOR BARCODE READERS

FIELD OF THE DISCLOSURE

The present patent relates generally to systems and methods for adapting swipe speeds for barcode readers and, in particular, relates to barcode readers that are configured to control identification sessions.

BACKGROUND

Venues, such as retail stores, often use bi-optic barcode readers in the checkout process to read barcodes affixed to products being checked out. Bi-optic barcode readers are typically formed with a horizontal window and a vertical window arranged in a way that image data can be captured by internal imaging components (e.g., imaging sensors) through either of the two windows. While these bi-optic barcode readers are effective at reading barcodes, known barcode readers are unable to accommodate clerks of different experience levels.

Accordingly, there remains a demand for continued design improvements in the field of bi-optic barcode readers that address the need of accommodating cashiers of different experience levels.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

In a first example, a barcode reader includes a housing and an optical imaging assembly positioned at least partially within the housing. The optical imaging assembly has a field of view (FOV). The optical imaging assembly is operable to capture one or more images of the FOV. The barcode reader also includes a processor communicatively coupled to the optical imaging assembly. The processor is configured to initiate an identification session when a target at least one of (i) enters the FOV and (ii) is in the FOV. The processor is further configured to, responsive to initiation of the identification session: terminate the identification session in response to identifying a product code associated with the target resulting in a termination of the identification session; responsive to the termination of the identification session, prevent initiation of a subsequent identification session until a detection of the target exiting the FOV; and responsive to the detection of the target exiting the FOV, enable initiation of a subsequent identification session.

In a second example, a method for enabling identification sessions includes capturing, via an optical imaging assembly having a field of view (FOV), one or more images of the FOV. The method also includes initiating, via a processor communicatively coupled to the optical imaging assembly, an identification session when a target is at least one of (i) enters the FOV and (ii) is in the FOV, and responsive to initiation of the identification session, via the processor: terminating the identification session in response to identifying a product code associated with the target resulting in a termination of the identification session; responsive to the termination of the identification session, preventing initiation of a subsequent identification session until a detection of the target exiting the FOV; and responsive to the detection of the target exiting the FOV, enabling initiation of a subsequent identification session.

In a variation of the second example, the method includes detecting, via the processor, the target entering the FOV or being in the FOV by comparing subsequent ones of the one or more images to preceding ones of the one or more images. In another variation of the second example, the method includes identifying, via the processor, contrast within the one or more images and identifying the target based on the contrast. In another variation of the second example, the method includes identifying, via the processor, presence of a human hand, thereby detecting the target being presented across the FOV. In another variation of the second example, the method includes generating, via the processor, a bounding box around at least a portion of the target. In another variation of the second example, the method includes processing, via the processor, the one or more images to track movement of the bounding box within the field of view. In another variation of the second example, the method includes identifying a trailing edge of the target within the bounding box. The target exiting the FOV is associated with the trailing edge of the target exiting the FOV.

In a third example, an indicia reader includes a housing and an optical imaging assembly positioned at least partially within the housing. The optical imaging assembly having a field of view (FOV). The optical imaging assembly is operable to capture one or more images of the FOV. The indicia reader includes a processor communicatively coupled to the optical imaging assembly. The processor is configured to initiate an identification session when a target at least one of (i) enters the FOV and (ii) is in the FOV. The processor is further configured to, responsive to initiation of the identification session: terminate the identification session in response to identifying the target resulting in a termination of the identification session; responsive to the termination of the identification session, prevent initiation of a subsequent identification session until a detection of the target exiting the FOV; and responsive to the detection of the target exiting the FOV, enable initiation of a subsequent identification session.

Figure 1:
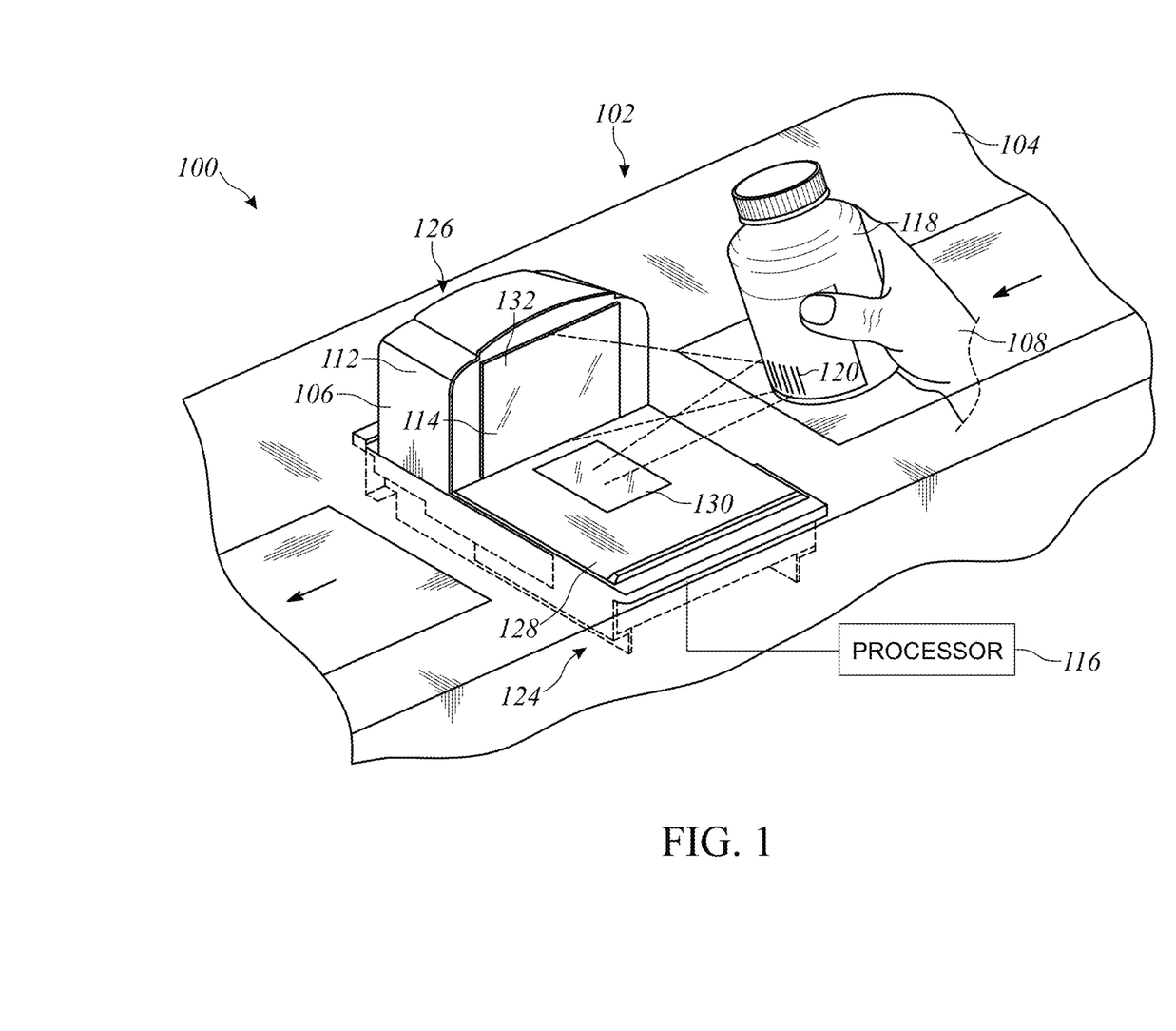
FIG. 1 illustrates a perspective view of an example checkout workstation in accordance with the teachings of this disclosure.

FIG. 1 illustrates a perspective view of an example point-of-sale (POS) system 100 in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products.

The barcode reader 106 includes a housing 112 that houses an optical imaging assembly 114. The optical imaging assembly 114 includes one or more image sensors and is communicatively coupled to a processor 116. The image sensors may include one or more color cameras, one or more monochrome imagers, one or more optical character readers, etc. The processor 116 may be disposed within the barcode reader 106 or may be in another location. The optical imaging assembly 114 includes one or more fields of view (FsOV) as described in further detail below and in connection with FIGS. 2 and 3. Further, the optical imaging assembly 114 is operable to capture one or more images of a target(s) 118 entering and/or being within the FOV.

In practice, the target 118, depicted as a bottle in the example shown, is swiped past the barcode reader 106. In doing so, a product code 120 associated with the target 118 is positioned within the field of view (FOV) of the optical imaging assembly 114. In the example shown, the product code 120 is a bar code. However, the product code 120 may alternatively be a radio-frequency identification (RFID) tag and/or any other product identifying code.

In response to capturing the one or more images (e.g., image data), in an example, the processor 116 processes the image data to determine an absence, a presence, movement, etc. of the target 118 within and/or relative to the FOV. Specifically, the processor 116 processes the image data in real time to determine when the target 118 enters the FOV of the optical imaging assembly 114, when the target 118 is within the FOV of the optical imaging assembly 114 and/or when the target 118 exits the FOV of the optical imaging assembly 114.

In some examples, the optical imaging assembly 114 has a relatively short focal length that allows the foreground in which the target 118 may be present to be better isolated from the background, thereby allowing for the target 118 to be more easily identified and/or tracked within the FOV. In some examples, processing the one or more images allows the processor 116 to identify an object that is moving in the FOV and to identify an object that is not moving in the FOV. The processing may also allow the processor 116 to differentiate between a larger item(s) within the FOV and a smaller item(s) within the FOV, a direction that the target 118 is moving within the FOV, etc.

In an example, when the target 118 is detected entering or being within the FOV, the processor 116 initiates an identification session during which the product code 120 carried by the target 118 can be read/identified. The identification session may be defined as a sequence of activation events such as the activation of the optical imaging assembly 114 as described herein. In some examples, the processor 116 compares the one or more images captured by the optical imaging assembly 114 to preceding ones of the one or more images to detect the target 118 entering the FOV or being in the FOV. For example, the target 118 may be identified using an edge detection technique where a bounding box 122 (the bounding box 122 is more clearly shown in FIGS. 5A, 5B, 5C, 5D) is used to determine if an object is moving within the FOV and, more specifically, to identify a leading edge and/or a trailing edge of the object. The object identified may be further analyzed to determine whether the object corresponds to a product (e.g., the target 118) having a product code 120. In an example, when one of the image sensors of the optical imaging assembly 114 detects the target 118 on either edge (or side) of the FOV (e.g., the frame), the processor 116 enables scanning from both of the image sensors. In some examples, processing the one or more images includes identifying the target 118 based on contrast identified within an image or images. In some examples, the processor 116 initiates the identification session when the target 118 is in the FOV and a preceding target has exited the FOV.

After the identification session has been initiated and to prevent the optical imaging assembly 114 from reading/identifying the product code 120 of the target 118 more than once, in an example, the processor 116 terminates the identification session after the product code 120 has been identified. As a result, the processor 116 adapts to the target 118 being swiped past the barcode reader 106 at different speeds and prevents the product code 120 from being inadvertently read more than once.

The processor 116 may be configured to identify the target 118 based on at least the size of the target 118, a color of the target 118, a shape of the target 118, a feature of the target 118, a logo displayed on the target 118, etc. In some examples, identifying the product code 120 includes successfully decoding symbology associated with the target 118. However, if the target 118 is detected exiting the FOV and/or entering and exiting the FOV without the product code 120 being identified, the processor 116 may generate an alert indicative of the target 118 not being scanned. Such an approach may be advantageous in detecting an individual (e.g., the clerk 108) attempting to avoid scanning the target 118, which may be referred to as the act of "scan avoidance."

After the processor 116 terminates the identification session, in an example, the processor 116 prevents a subsequent identification session from being initiated until the target 118 is detected existing the FOV of the optical imaging assembly 114. To allow the processor 116 to track the position and/or the movement of the target 118 within the FOV and/or to identify the target 118 within the FOV, in some examples, the processor 116 generates a bounding box 122 (the bounding box 122 is more clearly shown in FIGS. 5A, 5B, 5C, 5D) around at least a portion of the target 118.

In the example shown FIGS. 5A, 5B, 5C, and 5D, the bounding box 122 is a two-dimensional (2D) bounding box (e.g., a polygram). Alternatively, the bounding box 122 may be a three-dimensional (3D) bounding box. The bounding box 122 may be positioned around an object (e.g. the target 118) that is moving within the foreground of the FOV. Additionally, the bounding box 122 may be positioned around a higher-contrast area of the image. In examples in which the object is larger, the bounding box 122 may not completely surround the object. In such examples, the bounding box 122 may be positioned adjacent and/or around the product code 120 of the larger object. In the example shown, the processor 116 is configured to track movement of a foreground object (e.g., the target 118) in the FOV. Thus, a swipe gesture can be tracked within the FOV. To identify when the target 118 exits the FOV, the processor 116 identifies and determines when a trailing edge of the bounding box 122 exits the FOV. When the target 118 has exited the FOV, the processor 116 enables the initiation of a subsequent identification session.

The housing 112 includes a lower housing 124 and a raised housing 126. The lower housing 124 may be referred to as a first housing portion and the raised housing 126 may be referred to as a tower or a second housing portion. The lower housing 124 includes a top portion 128 with a first optically transmissive window 130. The first window 130 is positioned within the top portion 128 along a generally horizontal plane relative to the overall configuration and placement of the barcode reader 106. In some embodiments, the top portion 128 may include a removable or a non-removable platter (e.g., a weighing platter). The top portion 128 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 126 is configured to extend above the top portion 128 and includes a second optically transmissive window 132 positioned in a generally upright plane relative to the top portion 128 and/or the first window 130. Note that references to "upright" include, but are not limited to, vertical. Thus, as an example, something that is upright may deviate from a vertical axis/plane by as much as 45 degrees.

The optical imaging assembly 114 includes the image sensor(s) that is configured to digitally read the product code 120 through at least one of the first and second windows 130, 132. In the example shown, the field of view (FOV) includes a first sub-FOV 134 (the first sub-FOV 134 is more clearly shown in FIG. 2), a second sub-FOV 136 (the second sub-FOV 136 is more clearly shown in FIG. 2), a third sub field of view 138 (the third sub-FOV 138 is more clearly shown in FIG. 3), and a fourth sub field of view 140 (the fourth sub-FOV 140 is more clearly shown in FIG. 3). In an example, identifying the position of the target 118 through the first and second windows 130, 132 using the optical imaging assembly 114 allows for a virtual three-dimensional (3D) image of the swipe path of the target 118 through the FOV to be identified. The swipe path may include a diagonal swipe path. In addition to monitoring the swipe path, the processor 116 may process the one or more images captured by the optical imaging assembly 114 to track behavior of the clerk 108 including, for example, how the target 118 is held, the swipe direction most followed, etc.

While the above-example illustrates tracking the single target 118, in other examples, more than one target may be tracked.

Figure 2:
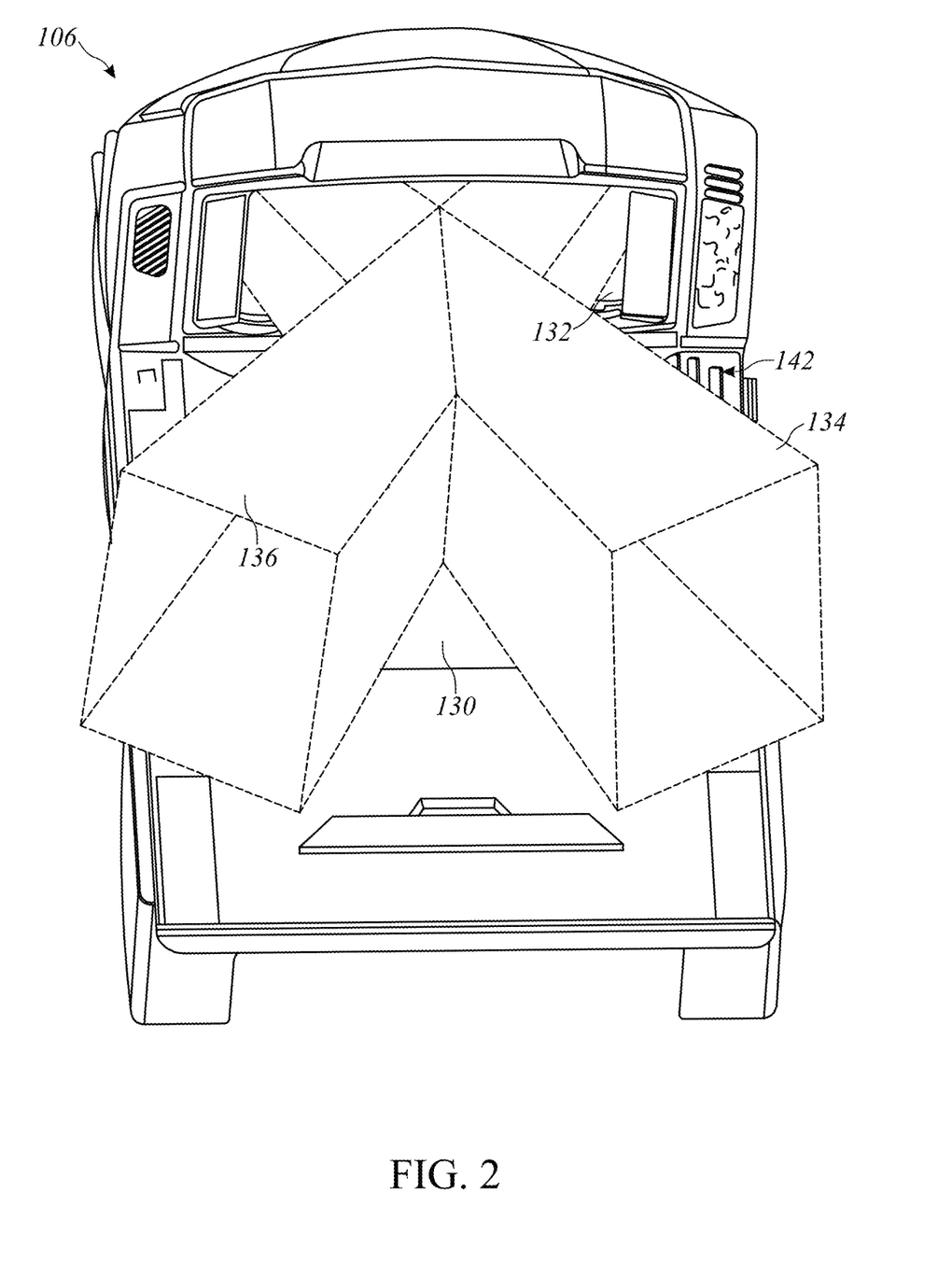
FIG. 2 illustrates example first and second sub-fields of view projecting from a generally vertical window of the barcode reader of FIG. 1.

FIG. 2 illustrates the first and second sub-FsOV 134, 136 projecting from the second window 132 of another example of the barcode reader 106 of FIG. 1. In the currently described embodiment, the fold mirrors (not shown) that are carried by the barcode reader 106 are positioned such that the first sub-FOV 134 and the second sub-FOV 136 intersect above the first window 130 and in a product-scanning region 142 of the barcode reader 106. The product-scanning region 142 is the general area where the target 118 is expected to be presented for image capture by the barcode reader 106. In some cases, the fold mirrors can be arranged to cause the first sub-FOV 134 and the second sub-FOV 136 to intersect partially. In other instances, the fold mirrors can be arranged to cause the first sub-FOV 134 and the second sub-FOV 136 to intersect fully. In still other instances, the fold mirrors can be arranged to cause a centroidal axis of each of the first sub-FOV 134 and the second sub-FOV 136 to intersect with or without regard for the cross-sectional dimensions of the FsOV.

Figure 3:
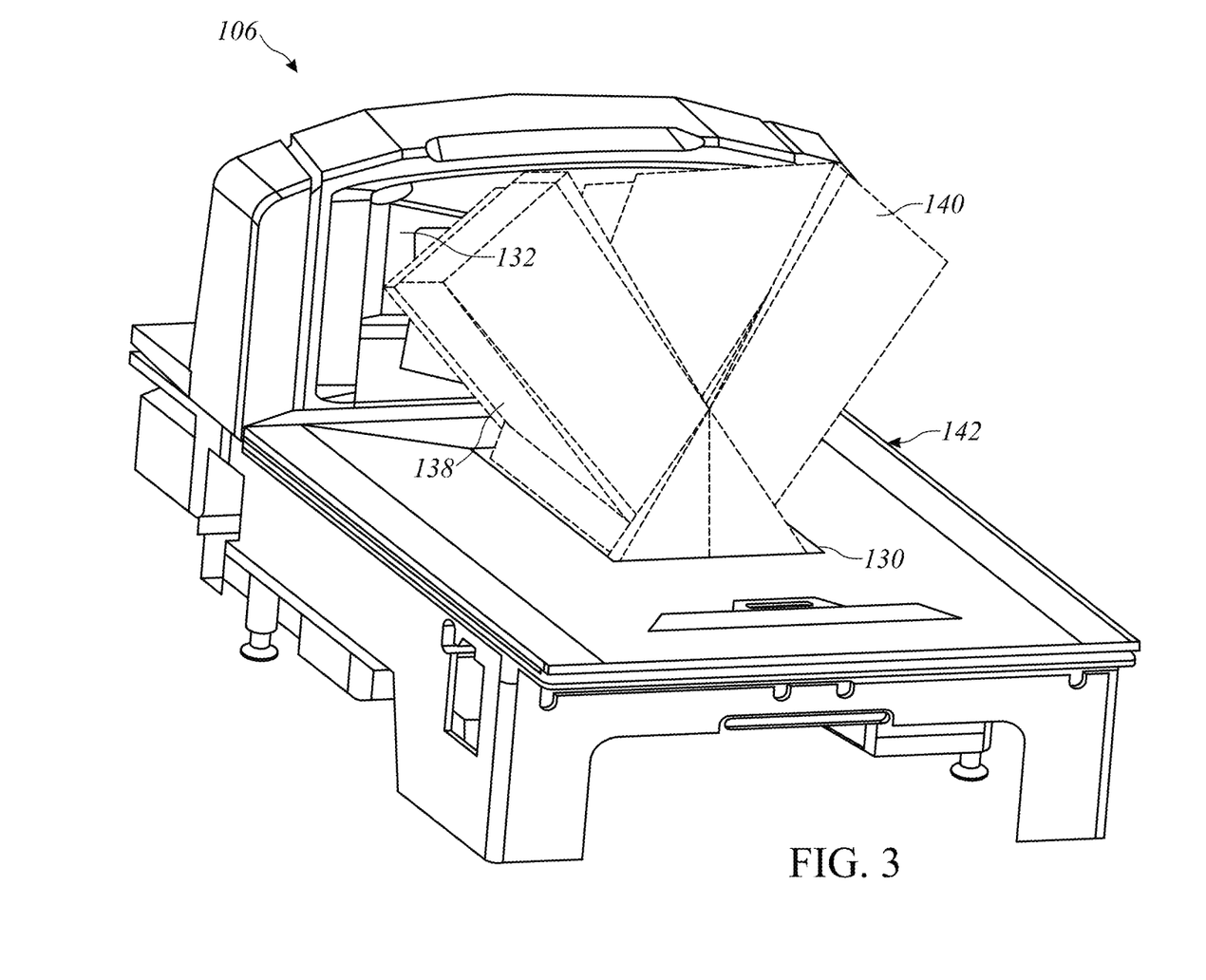
FIG. 3 illustrates example third and fourth sub-fields of view projecting from a generally horizontal window of the barcode reader of FIG. 1.

FIG. 3 illustrates the third and fourth sub FsOV 138, 140 projecting from the first window 130 of the barcode reader 106 of FIG. 2. In the currently described embodiment, the fold mirrors are positioned such that the third sub-FOV 138 and the fourth sub-FOV 140 intersect in front of the second window 132 and in the product-scanning region 142 of the barcode reader 200. In some cases, the fold mirrors can be arranged to cause the third sub-FOV 138 and the fourth sub-FOV 140 to intersect partially. In other instances, the fold mirrors can be arranged to cause the third sub-FOV 138 and the fourth sub-FOV 140 to intersect fully. In still other instances, the fold mirrors can be arranged to cause a centroidal axis of each of the third sub-FOV 138 and the fourth sub-FOV 140 to intersect with or without regard for the cross-sectional dimensions of the FsOV.

Figure 4:
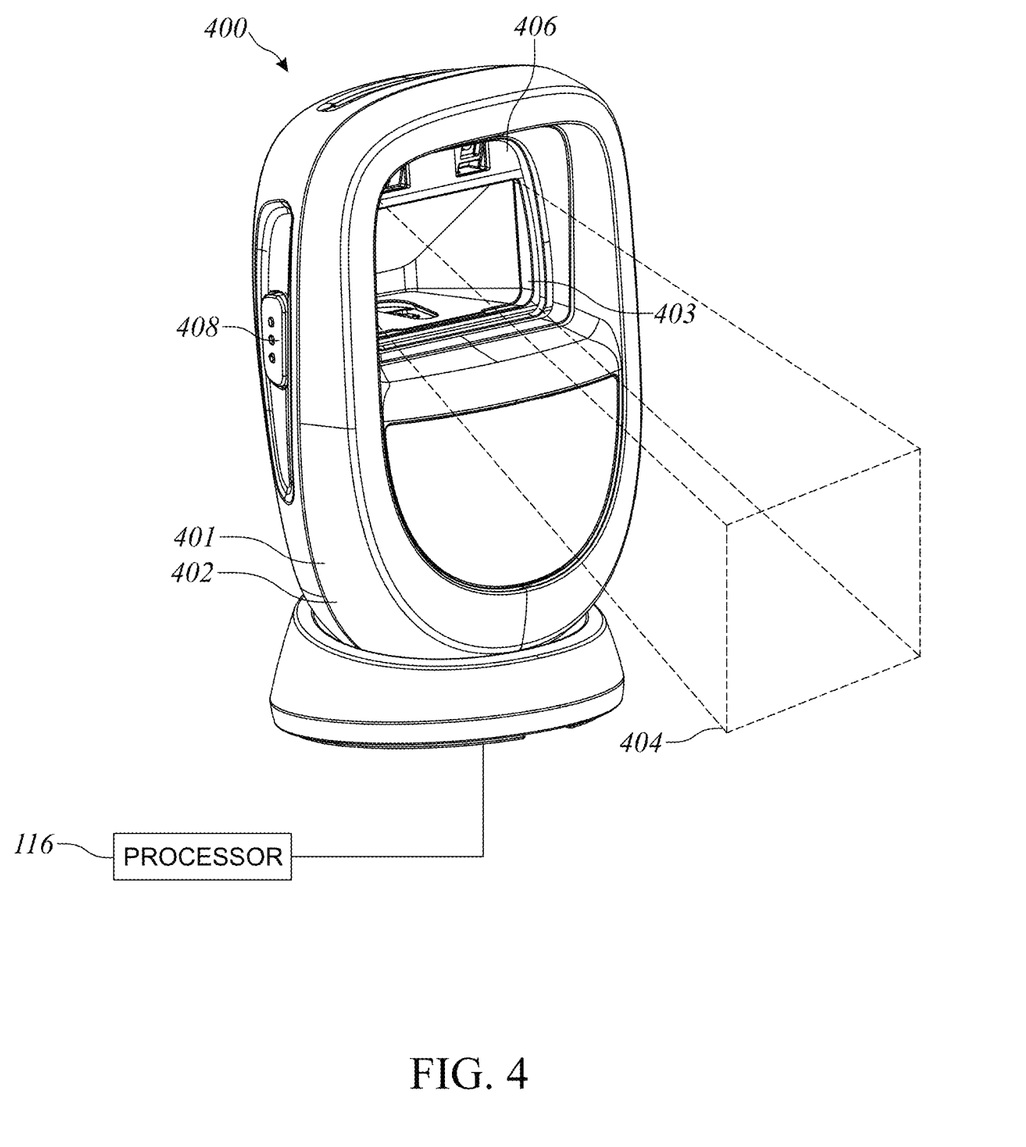
FIG. 4 illustrates an example scanner in accordance with the teachings of this disclosure.

FIG. 4 illustrates a perspective view of an example scanning device 400 in accordance with the teachings of this disclosure. The scanning device 400 may be referred to as an indicia reader. In the example shown, the scanning device 400 includes a housing 401 having a handle or a lower housing portion 402 and an optical imaging assembly 403. The optical imaging assembly 403 is at least partially positioned within the housing 401 and has a FOV 404. The scanning device 400 also includes an optically transmissive window 406 and a trigger 408. The optical imaging assembly 403 may include one or more image sensors that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor(s) of the optical imaging assembly 403 may have an imaging axis that extends through the window 406.

To operate the scanning device 400, a user may engage the trigger 408 causing the scanning device 400 to capture an image of a target, a product code, or another object. Alternatively, in some examples, the scanning device 400 may be activated in a presentation mode to capture an image of the target, the barcode, or the other object. In presentation mode, the processor 116 is configured to process the one or more images captured by the optical imaging assembly 403 to identify a presence of a target, initiate an identification session in response to the target being identified, terminate the identification session in response to the target being decoded, and prevent a subsequent identification session from being initiated until the target has exited the FOV of the optical imaging assembly 403.

Figure 5A:
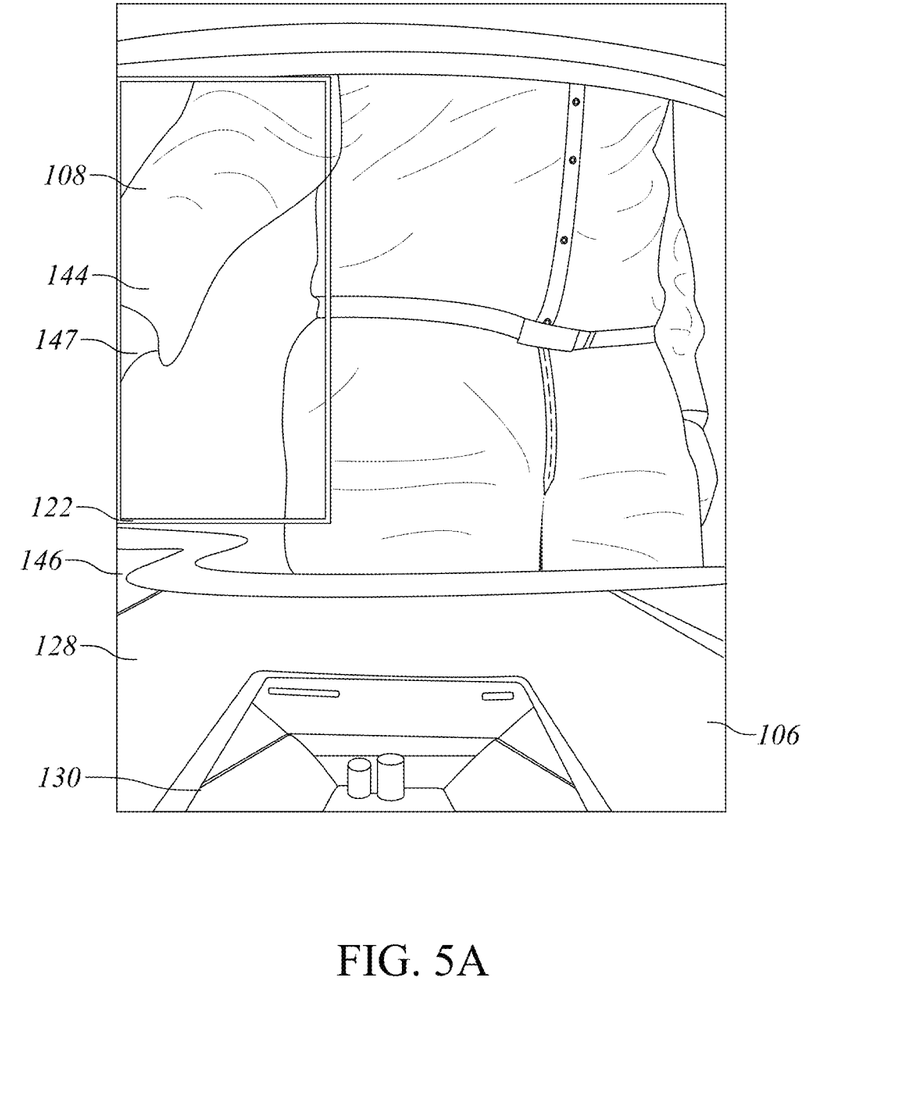
FIG. 5A illustrates an image captured by an example optical imaging assembly that includes a bounding box that surrounds an arm of a clerk as the arm enters a first side of a FOV of the optical imaging assembly.

FIGS. 5A, 5B, 5C, and 5D illustrate images captured by the optical imaging assembly 114 of FIG. 1. Referring to FIG. 5A, the bounding box 122 is shown surrounding an arm 144 of the clerk 108 as the arm 144 enters a first side 146 of the FOV of the optical imaging assembly 114. In an example, the processor 116 initiates an identification session when a human hand 147 is detected within the FOV, indicating that the target 118 is being presented across the FOV.

Figure 5B:
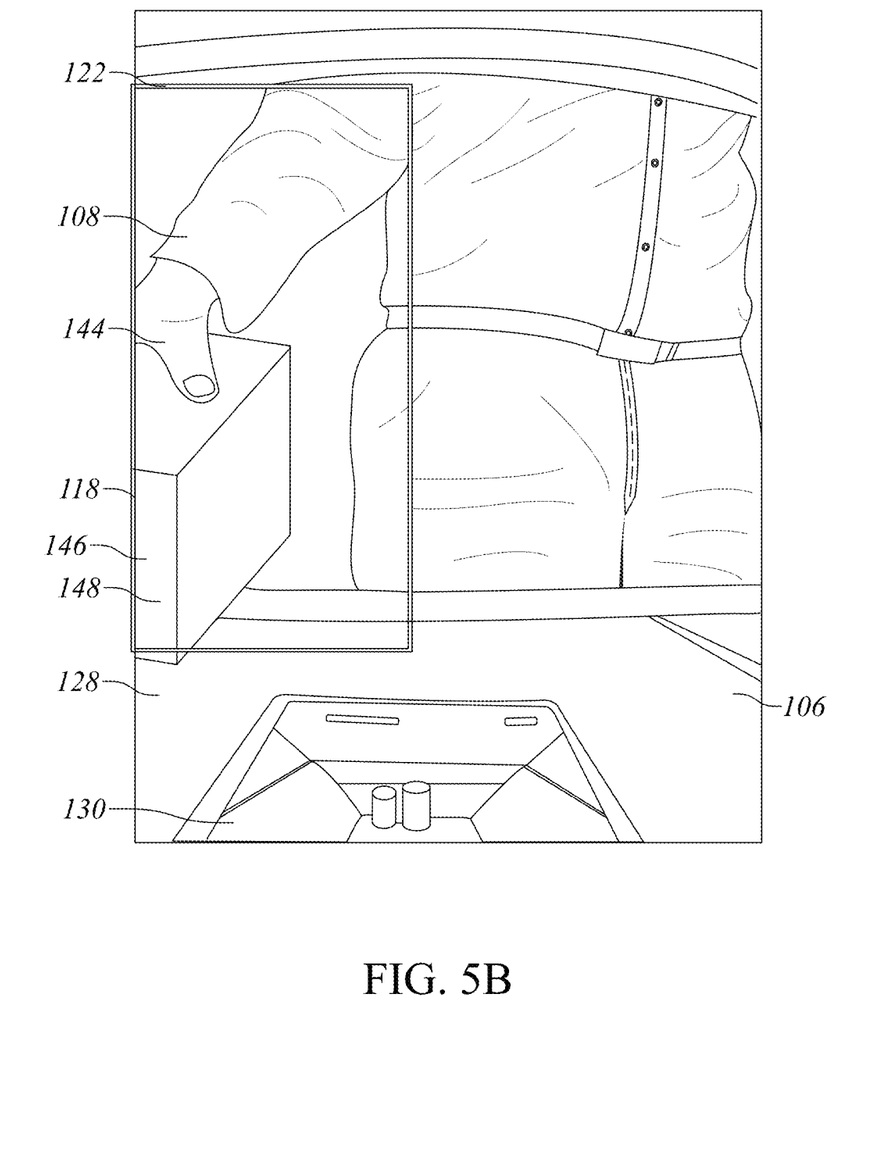
FIG. 5B illustrates another image captured by the example optical imaging assembly showing a leading edge of a target entering the first side of the FOV of the optical imaging assembly.

FIG. 5B illustrates a leading edge 148 of the target 118 entering the first side 146 of the FOV of the optical imaging assembly 114 and moving toward the first window 130 of the barcode reader 106. In an example, the processor 116 initiates an identification session when the target 118 enters or is in the FOV or, specifically, when the leading edge 148 of the target 118 is identified within the FOV.

Figure 5C:
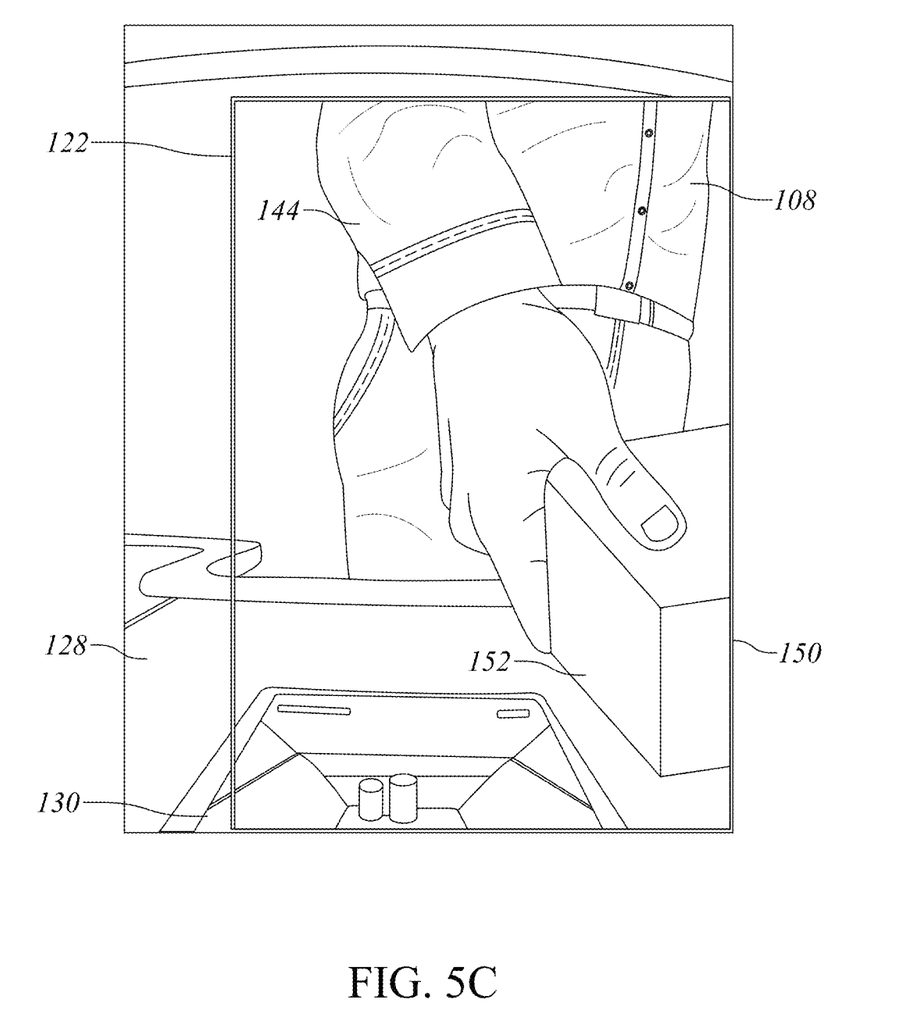
FIG. 5C illustrates another image captured by the example optical imaging assembly showing that the leading edge of the target has exited a second side of the FOV of the optical imaging assembly and a trailing edge of the target having passed over a first window of an example barcode reader.

FIG. 5C illustrates the leading edge 148 having exited a second side 150 of the FOV and a trailing edge 152 of the target 118 having passed over the first window 130. In an example, after the target 118 passes the first window 130, the product code 120 has been identified (e.g., decoded), causing the processor 116 to terminate the identification session and prevent another identification session from being initiated while the target 118 is within the FOV.

Figure 5D:
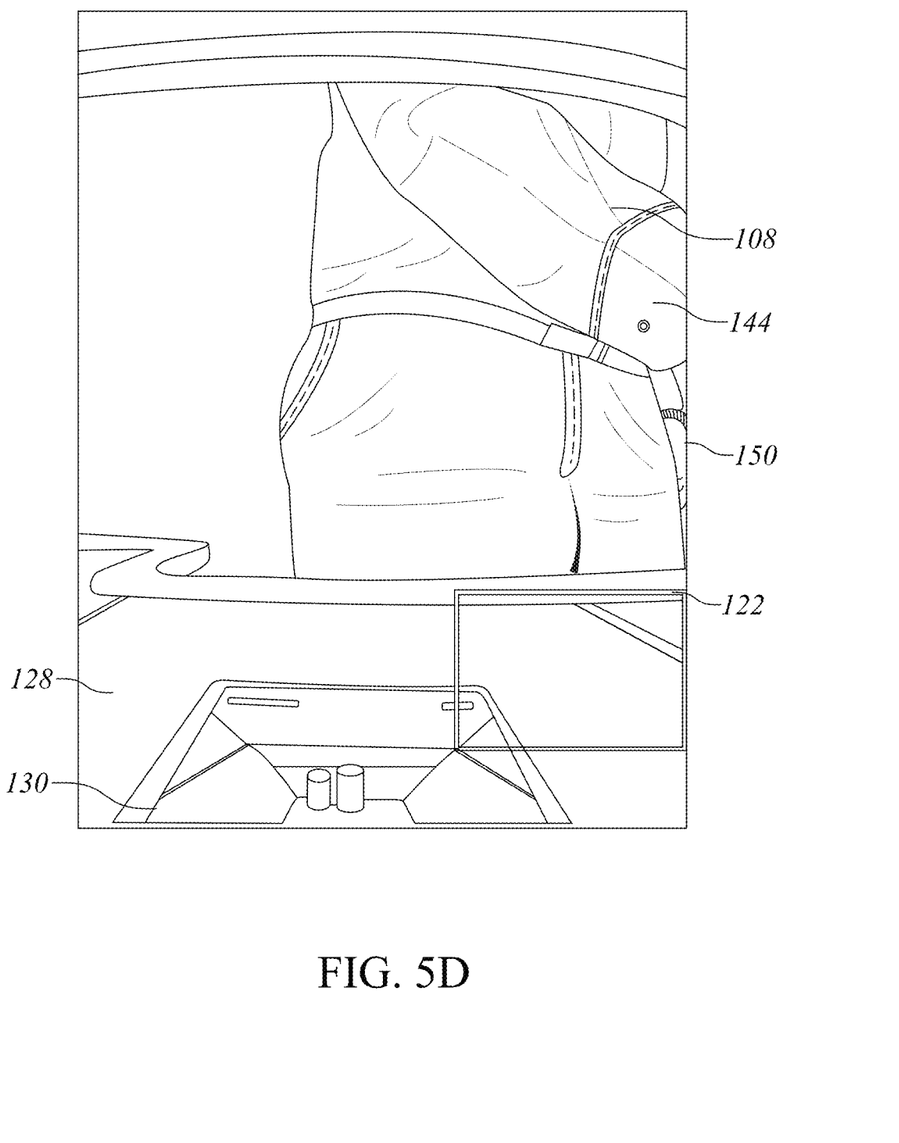
FIG. 5D illustrates another image captured by the example optical imaging assembly showing the target having exited the FOV of the optical imaging assembly.

FIG. 5D illustrates the target 118 having exited the FOV. In an example, the processor 116 enables a subsequent identification session to be initiated after the target 118 has exited the FOV.

Figure 6:
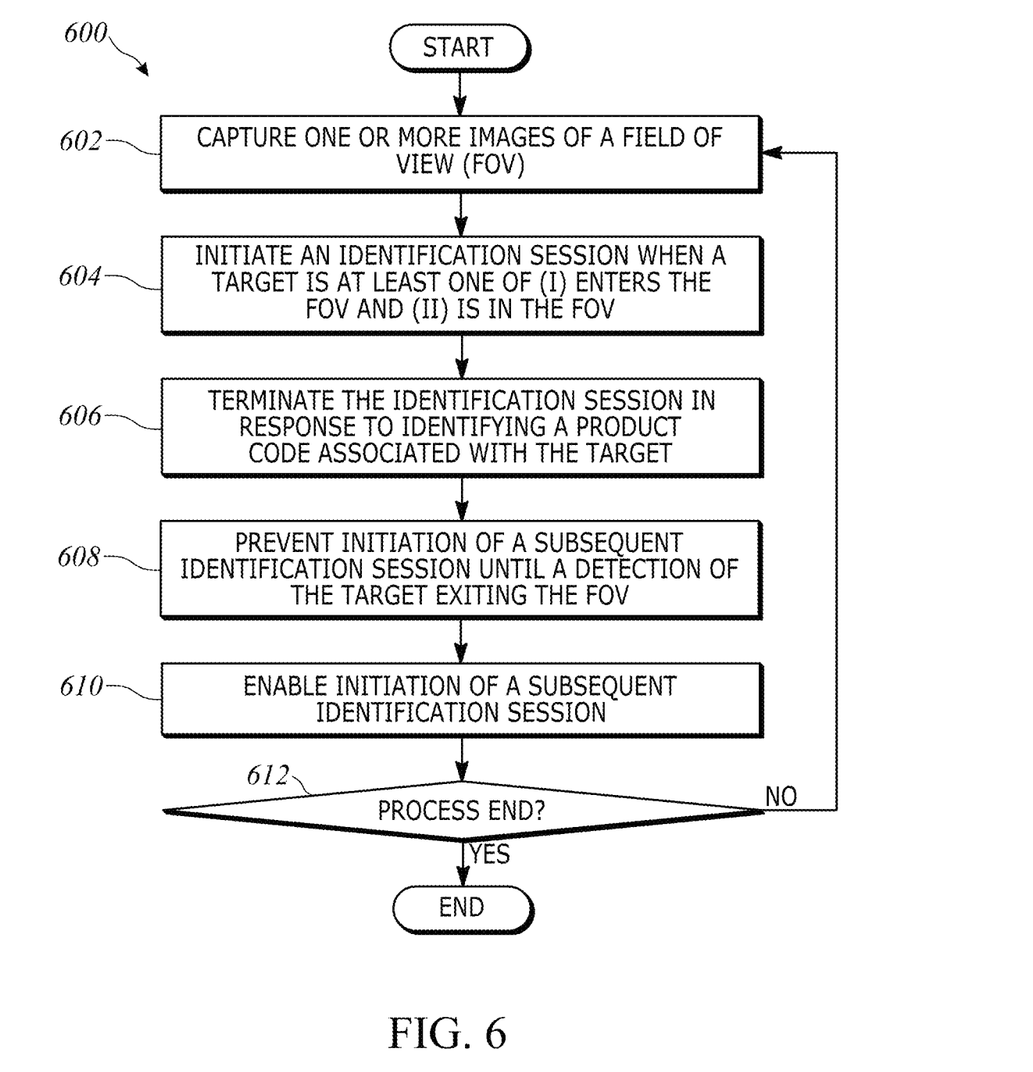
FIG. 6 illustrates a flowchart for a method for performing a method of controlling identification sessions, as implemented by the barcode reader of FIG. 1 and/or the scanning device of FIG. 4.

FIG. 6 illustrates a flowchart for performing a method of controlling identification sessions, as implemented by the barcode reader 106 of FIG. 1 and/or the scanning device 400 of FIG. 4. A process 600 begins at block 602 with one or more images being captured of a field of view (FOV). In some examples, the one or more images include one or more targets captured by the optical imaging assembly 114 of FIG. 1 and/or the optical imaging assembly 403 of FIG. 4.

An identification session is initiated when the target 118 at least one of 1) enters the FOV and 2) is in the FOV. (block 604). In some examples, the processor 116 detects the target entering and/or being within the FOV by comparing a subsequent image to a preceding image, identifying contrast within the image associated with the target 118 and/or detecting the presence of the hand 147 of the clerk 108 being presented across (or within) the FOV.

The identification session is terminated in response to the product code 120 associated with the target 118 being identified. (block 606). In response to the termination of the identification session, the initiation of a subsequent identification session is prevented until the target 118 is detected exiting the FOV. (block 608). In some examples, the target 118 is identified exiting the FOV when the trailing edge 152 of the target 118 exits the FOV. In an alternative example, the target 118 is identified exiting the FOV when a trailing edge of the bounding box 122 exits the FOV. Regardless, movement of the target 118 within and/or relative to the FOV may be tracked based on movements of the bounding box 122. At block 610, the initiation of a subsequent identification session is enabled in response to the target 118 exiting the FOV. (block 610). The process 600 decides whether to end or return to block 602. (block 612).

Figure 7:
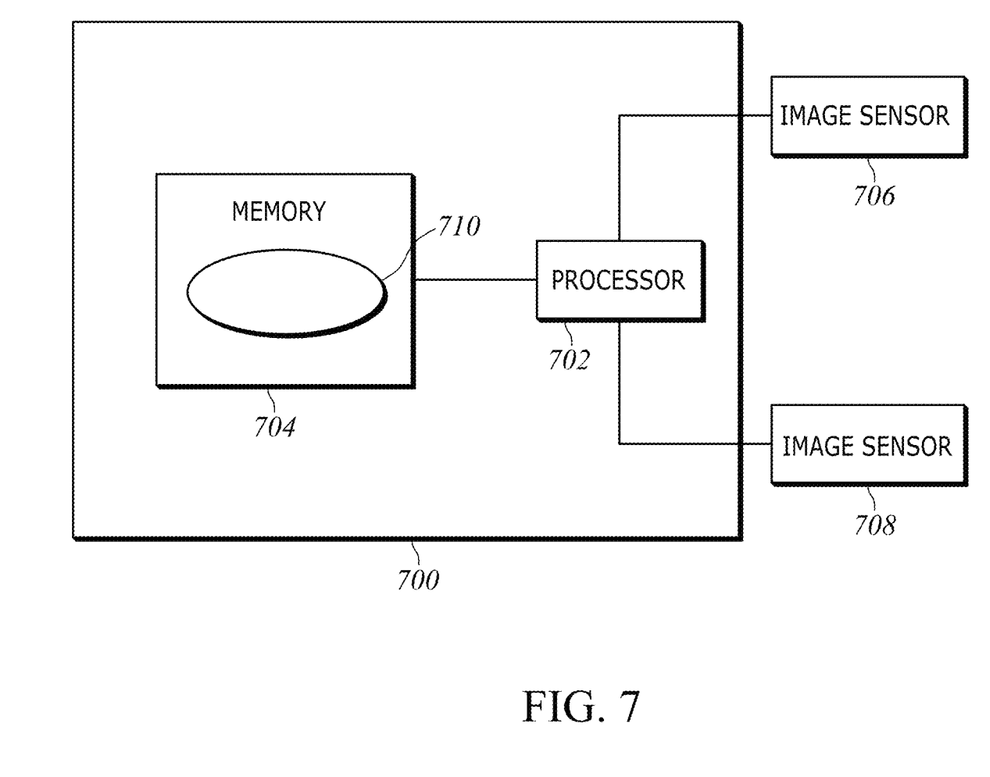
FIG. 7 illustrates an example processor platform coupled to a first image sensor and a second image sensor that can be used to implement the teachings of this disclosure.

FIG. 7 illustrates an example processor platform 700 including a processor 702 and a memory 704. In the example shown, the processor platform 700 is coupled to a first image sensor 706 and a second image sensor 708. The processor platform 700 and/or one or more of the image sensors 706, 708 may be used to implement the system 100 of FIG. 1 and/or the scanning device 400 of FIG. 4.

The processor 702 and the memory 704 can each comprise one or more integrated circuits (IC). The processor 702 runs or executes operating instructions or applications that are stored in the memory 704 to perform various functions for the system 100 of FIG. 1 and/or for the scanning device 400 of FIG. 4, including initiating an identification session when the target 118 enters or is within the FOV, terminating the identification session when the product code 120 of the target 118 has been identified, preventing the initiation of a subsequent identification session until the target 118 exits the FOV, and enabling the initiation of the subsequent identification session after the target 118 has exited the FOV. The processor 702, the system 100, and the scanning device 400 are therefore said herein to be "configured" to perform certain actions. The processor 702 can include one or more microprocessors, microcontrollers, digital signal processors (DSP), state machines, logic circuitry, or any device or devices that process information based on the operational or programming instructions stored in the memory 704. The memory 704 can include volatile memory and/or non-volatile memory and can include any one of, or any suitable combination of, storage technologies, including magnetic hard disks, flash memory, and the like.

Among the applications stored in the memory 704 is an identification session application 710 (also referred to as the application 710). The application 710 contains a plurality of computer-readable instructions that are executable by the processor 702. When the processor 702 executes the instructions of the application 710, the processor 702 performs various actions, and controls other components of the system 100 and/or the scanning device 400 as disclosed above.

In some examples, the system 100 and/or the scanning device 400 can include additional components (not shown) such as a network interface (e.g., wired and/or wireless interfaces) for communicating with other devices such as, for example, a point-of-sale computer, a display, a speaker and the like. The components of the system 100 and/or the scanning device 400 can be contained within the corresponding housing 112, 401, which can be constructed of any suitable material, or combination of materials (e.g., plastic, metals, and the like).

From the foregoing, it will be appreciated that the above disclosed apparatus, methods and articles of manufacture reduce the likelihood of a product being scanned more than once while allowing products to be scanned at different rates depending on an experience level of the clerk operating the barcode reader. Thus, the disclosed examples dynamically optimize the example systems and/or scanners based on the scanning behavior of an individual, increasing throughput while avoiding scanning the same product more than once. The disclosed examples are distinct to the known approach of using a same symbol time out (SSTO) parameter that may alternatively be used to avoid scanning a product more than once. However, in contrast to the disclosed examples, using the SSTO parameter alone may cause less experienced cashiers to accidently scan the same product more than once if the SSTO parameter is set to a shorter duration (e.g., 400 milliseconds (ms)) and may cause more experienced cashiers to slow down if the SSTO parameter is set to a longer duration (500 (ms)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader comprising:
a housing;
an optical imaging assembly positioned at least partially within the housing, the optical imaging assembly having a field of view (FOV), the optical imaging assembly operable to capture one or more images of the FOV; and
a processor communicatively coupled to the optical imaging assembly, the processor configured to initiate an identification session when a target at least one of (i) enters the FOV and (ii) is in the FOV, the processor further being configured to, responsive to initiation of the identification session:
terminate the identification session in response to identifying a product code associated with the target resulting in a termination of the identification session;

responsive to the termination of the identification session, prevent initiation of a subsequent identification session until a detection of the target exiting the FOV; and responsive to the detection of the target exiting the FOV, enable initiation of a subsequent identification session.

2. The barcode reader of claim 1, wherein the processor is configured to compare subsequent ones of the one or more images to preceding ones of the one or more images to detect the target entering the FOV or being in the FOV.

3. The barcode reader of claim 1, wherein the processor is configured to process the one or more images to identify contrast within the one or more images and to identify the target based on the contrast.

4. The barcode reader of claim 1, wherein the processor is configured to generate a bounding box around at least a portion of the target.

5. The barcode reader of claim 4, wherein the processor is configured to process the one or more images and, based on the processing, track movement of the bounding box within the field of view.

6. The barcode reader of claim 4, wherein the processor is configured to identify a trailing edge of the target, and wherein the target exiting the FOV is associated with the processor identifying the trailing edge of the target exiting the FOV.

7. The barcode reader of claim 1, wherein the processor is configured to initiate the identification session when the target is in the FOV and a preceding target has exited the FOV.

8. The barcode reader of claim 1, wherein identifying the product code includes successfully decoding symbology associated with the target.

9. The barcode reader of claim 1, wherein the barcode reader is a bi-optic scanner.

10. The barcode reader of claim 1, wherein the barcode reader is a scanning device having a handle.

11. A method for enabling identification sessions, the method comprising:
    capturing, via an optical imaging assembly having an field of view (FOV), one or more images of the FOV;
    initiating, via a processor communicatively coupled to the optical imaging assembly, an identification session when a target is at least one of (i) enters the FOV and (ii) is in the FOV, and responsive to initiation of the identification session, via the processor:
    terminating the identification session in response to identifying a product code associated with the target resulting in a termination of the identification session;
    responsive to the termination of the identification session, preventing initiation of a subsequent identification session until a detection of the target exiting the FOV; and
    responsive to the detection of the target exiting the FOV, enabling initiation of a subsequent identification session.

12. The method of claim 11, further comprising detecting, via the processor, the target entering the FOV or being in the FOV by comparing subsequent ones of the one or more images to preceding ones of the one or more images.

13. The method of claim 11, further comprising, identifying, via the processor, contrast within the one or more images and identifying the target based on the contrast.

14. The method of claim 11, further comprising, identifying, via the processor, presence of a human hand, thereby detecting the target being presented across the FOV.

15. The method of claim 14, further comprising identifying a trailing edge of the target within bounding box, and wherein the target exiting the FOV is associated with the trailing edge of the target exiting the FOV.

16. The method of claim 11, further comprising generating, via the processor, a bounding box around at least a portion of the target.

17. The method of claim 16, further comprising processing, via the processor, the one or more images to track movement of the bounding box within the field of view.

18. The method of claim 11, wherein initiating the identification session when the target is in the FOV includes initiating the identification session when the target is in the FOV and a preceding target has exited the FOV.

19. An indicia reader comprising:
    a housing;
    an optical imaging assembly positioned at least partially within the housing, the optical imaging assembly having a field of view (FOV), the optical imaging assembly operable to capture one or more images of the FOV; and
    a processor communicatively coupled to the optical imaging assembly, the processor configured to initiate an identification session when a target at least one of (i) enters the FOV and (ii) is in the FOV, the processor further being configured to, responsive to initiation of the identification session:
    terminate the identification session in response to identifying the target resulting in a termination of the identification session;
    responsive to the termination of the identification session, prevent initiation of a subsequent identification session until a detection of the target exiting the FOV; and
    responsive to the detection of the target exiting the FOV, enable initiation of a subsequent identification session.

20. The indicia reader of claim 19, wherein the target includes at least one of a barcode and a RFID tag.

21. The indicia reader of claim 19, and wherein the indicia reader comprises an optical character reader.

22. The indicia reader of claim 19, wherein the processor is to identify the target based on at least one of a size of the target, a color of the target, a shape of the target, and a logo displayed on the target.

23. The indicia reader of claim 19, wherein the processor is configured to detect presence of a human hand, associated with the target being presented across the FOV.

24. The indicia reader of claim 19, wherein the processor is configured to generate a bounding box around at least a portion of the target.

25. The indicia reader of claim 24, wherein the processor is configured to process the one or more images and, based on the processing, track movement of the bounding box within the field of view.

26. The indicia reader of claim 24, wherein the processor is configured to identify a trailing edge of the target, and wherein the target exiting the FOV is associated with the processor identifying the trailing edge of the target exiting the FOV.

* * * * *